United States Patent Office 3,530,215
Patented Sept. 22, 1970

---

3,530,215
CONDITIONING HAIR WITH QUATERNIZED HOMOPOLYMERS
Norman L. Greif, North Woodmere, Sheldon Levy, Rego Park, and William Perlberg, Bellmore, N.Y., and Milton H. Schwarz, Westport, Conn., assignors to Revlon, Inc., New York, N.Y., a corporation of Delaware
No Drawing. Filed July 28, 1966, Ser. No. 568,412
Int. Cl. A61k 7/10
U.S. Cl. 424—70                              4 Claims

---

ABSTRACT OF THE DISCLOSURE

This invention relates to methods and compositions for conditioning and setting hair, and relates in particular to methods for conditioning and setting human hair with compositions comprising aqueous solutions of alcohol-insoluble quaternized homopolymers of dimethylaminoethyl methacrylate or diethylaminoethyl methacrylate.

---

U.S. Pat. 2,138,763 granted Nov. 29, 1938, to Graves teaches monomeric dialkylaminoethyl methacrylates and polymers thereof. Such polymers can be quaternized to varying degrees by reaction with a quaternizing agent by techniques well-known in the art, or quaternized polymers may be prepared by polymerization of quaternized dialkylaminoethyl methacrylate monomers.

According to the present invention, it has been found that aqueous solutions of certain of these quaternized polymers are excellent for conditioning and setting human hair. By "setting" the hair is meant herein the maintenance of a configuration of the hair between washings. By "conditioning" the hair is meant herein the imparting thereto of a smooth feel and high lustre, and the promotion of easy combing by obviating drag or raspiness.

The compositions of the present invention in their simplest form comprise aqueous solutions of alcohol-insoluble quaternized resinous polymers of dimethylaminoethyl or diethylaminoethyl methacrylate in concentrations between about 0.5 to about 10 percent by weight. A preferred concentration of resin in the aqueous solutions is from about 2 to about 4 percent.

In preferred embodiments of the invention, a plasticizer for the resin is included in the aqueous compositions. Preferred plasticizers include water-soluble proteins, i.e., collagen-derived polypeptides prepared from proteins such as gelatin, albumin, etc., according to methods well-known in the prior art. Other plasticizers include water-soluble lanolin derivatives, for example alkoxylated lanolin or alkoxylated lanolin alcohols, such as ethoxylated lanolin or ethoxylated lanolin alcohols. Alkoxylated, e.g., ethoxylated, fatty alcohols can similarly be employed to plasticize the resins. The plasticizers are commonly incorporated into the compositions to comprise about 1/10 to 1/2 of the weight of resin present.

Optional ingredients which may be present in the compositions, if desired, include additional water-soluble resins to impart stiffness, thickening agents to adjust the viscosity of the solutions and to contribute to the formation of films, preservatives, perfumes, etc.

The compositions are suitably applied either to dry or to damp hair, but preferably to damp hair, by massaging them into the hair or by combing them through the hair. The hair is then set and dried without rinsing.

Compositions superficially similar to those described and claimed in the present application are shown in the prior art applied to the hair. U.S. Pat. 3,026,250 to Coyner, for example, teaches copolymeric materials comprising from 15 to 90 percent by weight of partially quaternized dialkylethylamino methacrylates in combination with a further ethylenic comonomer. These prior art compositions critically require the presence of the additional comonomer and are always only partially quaternized. These prior art copolymers are alcohol-soluble, are usually applied in the form of an aerosol spray, and may set, but do not condition, the hair.

U.S. Pat. 3,144,391 to Goff discloses copolymers of dialkylaminoethyl methacrylates with lauryl methacrylate. These copolymers are alcohol-soluble and water-insoluble, and are critically employed in combination with cationic surface-active agents. Conditioning of the hair is primarily effected by the cationic additives, which are known in the art to be substantive to hair.

In contrast with the compositions of both Coyner and Goff, the quaternized resins employed in the compositions of the present invention are alcohol-insoluble. Once the compositions have been applied to the hair, the hair will remain set despite subsequent application of other treating agents, such as the popular aerosol hair sprays, which contain alcohol. Indeed, although quaternized resins comprising dimethylaminoethyl or diethylaminoethyl methacrylate can both be employed according to the present invention, the quaternized dimethylethylamino materials are preferred because of their greater insolubility in alcohol, although both resins are excellent hair conditioners. Further, the quaternized resins per se function as hair conditioners, in the absence of cationic additives.

For quaternizing the dialkylaminoethyl groups of the homopolymers of the invention, alkyl halides having from 1 to 18 carbon atoms and di- lower alkyl sulfates are employed. These quaternizing agents include the alkyl chlorides, bromides and iodides such as methyl chloride, methyl bromide, methyl iodide, ethyl chloride, lauryl bromide, and lauryl or octadecyl chlorides (in the presence of iodine). The di- lower alkyl sulfates most commonly employed are dimethyl sulfate and diethyl sulfate. In general, quaternizing agents containing lower alkyl groups having 1 to 4 carbon atoms are preferred, since they impart maximum alcohol insolubility to the resins treated. Methyl bromide has proved particularly good as a quaternizing agent.

The quaternizing agent and polymer are reacted in conventional manner until at least 80 percent of the amino groups present in the polymer are quaternized. The greater the degree of quaternization, in general, the clearer and more flexible are the resulting quaternized resins.

Fully quaternized resins are preferred according to the present invention. If a greater degree of stiffness is desired to be imparted to the hair by a product comprising a fully quaternized resin of the invention, other conventional water-soluble hair setting resins such as polyvinyl pyrrolidone or copolymers of vinyl pyrrolidone and vinyl acetate can be included in the product in amounts of from 0.5 to 2 percent. These additional resins must be water-soluble, but need not be alcohol-insoluble, as is the principal quaternized resin component.

In general, the compositions of the invention comprise the quaternized resins, plasticizers, and optional stiffening resins, thickeners, and preservatives in the following amounts:

| Component: | Percent |
|---|---|
| Quarternized resin solids (80–100 percent quaternized) | 0.5–10 |
| Plasticizer | 0.1–3 |
| Nonquaternized stiffening resins (optional) | 0.5–2 |
| Water-soluble thickeners and film-formers (optional) | 0.05–0.4 |
| Alcohol preservative (optional) | 10–30 |
| Perfume | Q.v. |
| $H_2O$—to give 100 percent. | |

A better understanding of the present invention and of its many advantages will be had by referring to the following specific example given by way of illustration.

EXAMPLE

A typical composition for conditioning and setting the hair is formulated as follows:

| Components: | Percent |
|---|---|
| Dimethylaminoethyl methacrylate, fully quaternized with methyl bromide | 3 |
| Water-soluble protein | 0.5 |
| Perfume oils | Q.v. |
| Cellulose gum or polyethylene oxide polymers | 0.1–0.2 |
| Denatured ethanol | 15 |
| Water—to give 100 percent. | |

The water-soluble protein is a polypeptide derived from collagen, suitably by the degradation of gelatin, albumin, or the like. Cellulose gum or polyethylene oxide polymers are present to adjust the viscosity of the solution to a desirable consistency. The alcohol is employed as a preservative.

The composition is applied to damp or dry hair in amounts sufficient to moisten the hair, which is then set and dried.

The resin component of the composition is prepared by refluxing 100 parts by weight of dimethylaminoethyl methacrylate for three to five hours in 100 parts of isopropanol in the presence of 0.25 percent of $\alpha,\alpha$-azobisisobutyronitrile to give a polymer principally of an average molecular weight between about 7000 and 8000. Variation of the reaction conditions will produce suitable water-soluble alcohol-insoluble polymers of an average molecular weight between about 2,000 and 20,000. The polymer solution is then cooled and diluted with 300 parts of water. Excess methyl bromide is then added as either a liquid or gas over ¾ hour, with cooling to maintain a temperature of 25°–35° C. Heating is maintained for ½ hour after addition is complete. The resulting mixture is steam-distilled to remove residual reactants and alcohol.

Resins in which fewer than all amino groups have been polymerized are prepared in analogous fashion using a smaller proportion of quaternizing agent. The resins are incorporated into the composition of the example in the amount indicated for the fully quaternized product. However, they are not as clear as the fully quaternized resin and impart a stiffer feel to hair treated therewith.

What is claimed is:

1. The method of conditioning and setting human hair which comprises applying thereto an aqueous solution comprising from about 0.5 to about 10 percent by weight of an alcohol-insoluble quaternary ammonium salt of a homopolymer of dimethylaminoethyl methacrylate or diethylaminoethyl methacrylate, said homopolymer having an average molecular weight between about 2,000 and 20,000 and at least about 80 percent of the amino groups in said homopolymer being quaternized.

2. The method as in claim 1 wherein said solution comprises from about 2 to about 4 percent by weight of said salt.

3. The method as in claim 1 wherein said quaternary ammonium salt is the methyl bromide salt of a homopolymer of dimethylaminoethyl methacrylate.

4. The method as in claim 1 wherein said quaternary ammonium salt is the methyl iodide salt of a homopolymer of dimethylaminoethyl methacrylate.

References Cited

UNITED STATES PATENTS

| | | | |
|---|---|---|---|
| 2,838,397 | 6/1958 | Gruntfest et al. | 260—89.5 X |
| 2,942,008 | 6/1960 | Lubowe | 424—71 X |
| 3,026,250 | 3/1962 | Coyner | 424—71 X |
| 3,099,636 | 7/1963 | Skiles | 260—89.5 X |
| 3,130,127 | 4/1964 | Tarpey | 424—71 |
| 3,144,391 | 8/1964 | Goff | 424—71 X |
| 3,206,362 | 9/1965 | Hollub et al. | 424—71 X |

FOREIGN PATENTS 535,676    8/1955    Belgium.

OTHER REFERENCES

David: Drug and Cosmetic Industry, vol. 97, No. 4, September 1965, pp. 502–504 and 618–621.

ALBERT T. MEYERS, Primary Examiner

N. A. DREZIN, Assistant Examiner

U.S. Cl. X.R.

424—71, 81; 260—89.5